United States Patent
Oh et al.

(10) Patent No.: US 7,483,497 B2
(45) Date of Patent: Jan. 27, 2009

(54) METHOD AND APPARATUS FOR CALCULATING LOG-LIKELIHOOD RATIO FOR DECODING IN A RECEIVER FOR A MOBILE COMMUNICATION SYSTEM

(75) Inventors: Jeong-Tae Oh, Yongin-si (KR); Jae-Hyok Lee, Seoul (KR); Ji-Ho Jang, Seoul (KR); Jae-Ho Jeon, Seongnam-si (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 11/212,928

(22) Filed: Aug. 29, 2005

(65) Prior Publication Data
US 2006/0045211 A1    Mar. 2, 2006

(30) Foreign Application Priority Data
Aug. 30, 2004  (KR) .................. 10-2004-0068592

(51) Int. Cl.
*H04L 27/22* (2006.01)
(52) U.S. Cl. .................. 375/341; 375/324; 375/329
(58) Field of Classification Search .................. 375/322, 375/324, 329, 340, 341
See application file for complete search history.

(56) References Cited

U.S. PATENT DOCUMENTS

| | | | |
|---|---|---|---|
| 6,594,318 B1 * | 7/2003 | Sindhushayana | |
| 6,772,389 B2 * | 8/2004 | Kim et al. | |
| 6,834,088 B2 * | 12/2004 | Agami et al. | ............... 375/324 |
| 2004/0091058 A1 * | 5/2004 | Tosato et al. | ............... 375/261 |

\* cited by examiner

*Primary Examiner*—David B Lugo
(74) *Attorney, Agent, or Firm*—Roylance, Abrams, Berdo & Goodman, LLP (57) ABSTRACT

A method and apparatus are provided for calculating a log-likelihood ratio (LLR) for decoding in a receiver for a mobile communication system, wherein the method and apparatus determine selection bits for distinguishing four quadrants in a constellation representing signal points of transmission symbols, determine domain bits for distinguishing the signal points in each domain of the four quadrants according to a modulation order of the transmission symbols, repeat an operation of dividing a received signal into a real component and an imaginary component according to the number of determined domain bits, calculate and origin-shift absolute values of the real component and the imaginary component, and calculate LLRs for the selection bits. Further, the method and apparatus can subsequently calculate LLRs for corresponding domain bits each time the origin-shifted received signal is received.

20 Claims, 7 Drawing Sheets

METHOD AND APPARATUS FOR CALCULATING LOG-LIKELIHOOD RATIO FOR DECODING IN A RECEIVER FOR A MOBILE COMMUNICATION SYSTEM

CROSS-REFERENCE TO RELATED APPLICATIONS

This application claims the benefit under 35 U.S.C. §119 (a) of Korean Patent Application No. 10-2004-0068592 entitled "Method And Apparatus For Calculating Log-Likelihood Ratio For Decoding In A Receiver For A Mobile Communication System" filed in the Korean Intellectual Property Office on Aug. 30, 2004, the entire disclosure of which is incorporated herein by reference.

BACKGROUND OF THE INVENTION

1. Field of the Invention

The present invention relates generally to a decoding method and apparatus for a receiver in a mobile communication system. More particularly, the present invention relates to a log-likelihood ratio (LLR) calculation method and apparatus for decoding in a receiver for a mobile communication system using Quadrature Phase Shift Keying (QPSK) or Quadrature Amplitude Modulation (QAM).

2. Description of the Related Art

In general, modulation refers to a process of converting a signal into a format suitable for a transmission channel using a carrier in order to transmit the signal to a desired destination without error. Among modulation schemes, a modulation scheme of shifting a phase of the carrier according to a digital transmission signal is called "Phase Shift Keying (PSK)". Many communication systems use QPSK having an extended concept of PSK, or Binary PSK (BPSK) in which there is provided a 180°-phase difference between carriers.

While BPSK distinguishes only two kinds of signals, that is '1' and '0', QPSK distinguishes four kinds of signals, including '00', '01', '10' and '11'. Theoretically, QPSK doubles BSPK in terms of the amount of data that can be transmitted for a specific time because QPSK can transmit four kinds of 2-bit digital signals. In other words, while BPSK shifts a phase of the carrier by 180° during transmission, QPSK shifts a phase of the carrier by 90° and transmits 4 signals, thereby increasing the amount of transmission data.

Another typical modulation scheme for transmitting a large volume of data is QAM, which modulates a digital signal by changing an amplitude and phase of the signal. Because QAM, unlike PSK, BPSK and QPSK, uses not only the phase of the signal but also the amplitude of the signal as parameters, it can simultaneously transmit a large amount of digital data and uses as many signal coordinates as a multiplier of 2. The QAM scheme is classified into 16QAM, 64QAM and 256QAM according to the number of signal coordinates.

For example, in the case of 16QAM, digital signals quantized in 16 levels are scattered over 16 signal coordinates in an I/Q plot. That is, 16QAM can transmit 4-bit binary digital signals per coordinate though 16 signal domains which are different in phase and amplitude. A receiver for a communication system using QAM demodulates a received signal into its original signal by observing on which domain the received signal is located on the basis of a boundary distinguishing the signal coordinates.

Due to the increase in the amount of communication data, research into communication systems is being conducted to transmit the increasing amount of data by systems having limited bandwidth. As a result, although the conventional communication system transmits 2 bits per symbol using QPSK, the more recent communication systems can transmit 4 bits per symbol using 16QAM and 6 bits per symbol using 64QAM. That is, the increase in modulation order of QAM increases the number of bits per transmission symbol.

However, the signals transmitted using QPSK or QAM have a high reception error rate, as they are distorted through radio channels. In order to decrease the error rate, a transmitter commonly uses turbo coding. A receiver for a communication system using turbo coding calculates a log-likelihood ratio (LLR) from the received signal modulated with QPSK or QAM, in a decoding process, and performs iterative decoding depending on the calculated LLR, thereby improving decoding reliability.

The LLR, which is a probability value provided as priori information for the next decoding in the iterative decoding process, increases its calculation load as a modulation order of transmission symbols increases, causing an increase in the load on the receiver.

A description will now be made of a conventional LLR calculation method for a QAM decoder by way of example.

An LLR used in the QAM decoder is calculated using Equation (1) below.

$$LLR = \text{Log}\left(\frac{\sum_i p(s_i^0 \mid r)}{\sum_i p(s_i^1 \mid r)}\right) \qquad \text{Equation (1)}$$

$$= \text{Log}\left(\frac{\sum_i \frac{p(r \mid s_i^0)p(s_i^0)}{p(r)}}{\sum_i \frac{p(r \mid s_i^1)p(s_i^1)}{p(r)}}\right)$$

$$= \text{Log}\left(\frac{\sum_i p(r \mid s_i^0)}{\sum_i p(r \mid s_i^1)}\right)$$

In Equation (1), $p(s_i^0 \mid r)$ and $p(s_i^1 \mid r)$ denote aposteriory probabilities when signal points $s_i$ corresponding to a bit '0' and a bit '1' in signal coordinates of a constellation are transmitted in response to a received signal r. Further, $p(s_i^0)$ and $p(s_i^1)$ denote probabilities that signal points si corresponding to a bit '0' and a bit '1' will occur, respectively. Herein, it is assumed that the probabilities are equal to each other.

In the case of a simple QPSK scheme, a transmitter transmits one of 4 signal points on a constellation per every 2 bits, and a receiver calculates LLRs using the aposteriory probabilities on the assumption that the reception signal and the signal point on the constellation have been transmitted. In this case, one of the two bits defines one of two signal points on a real axis in the constellation, and the other one bit defines the other one of the two signal points on an imaginary axis in the constellation. Therefore, the receiver is allowed to calculate an LLR using only one signal point associated with the corresponding bit in the process of calculating the aposteriory probability for each bit.

Figure 1:
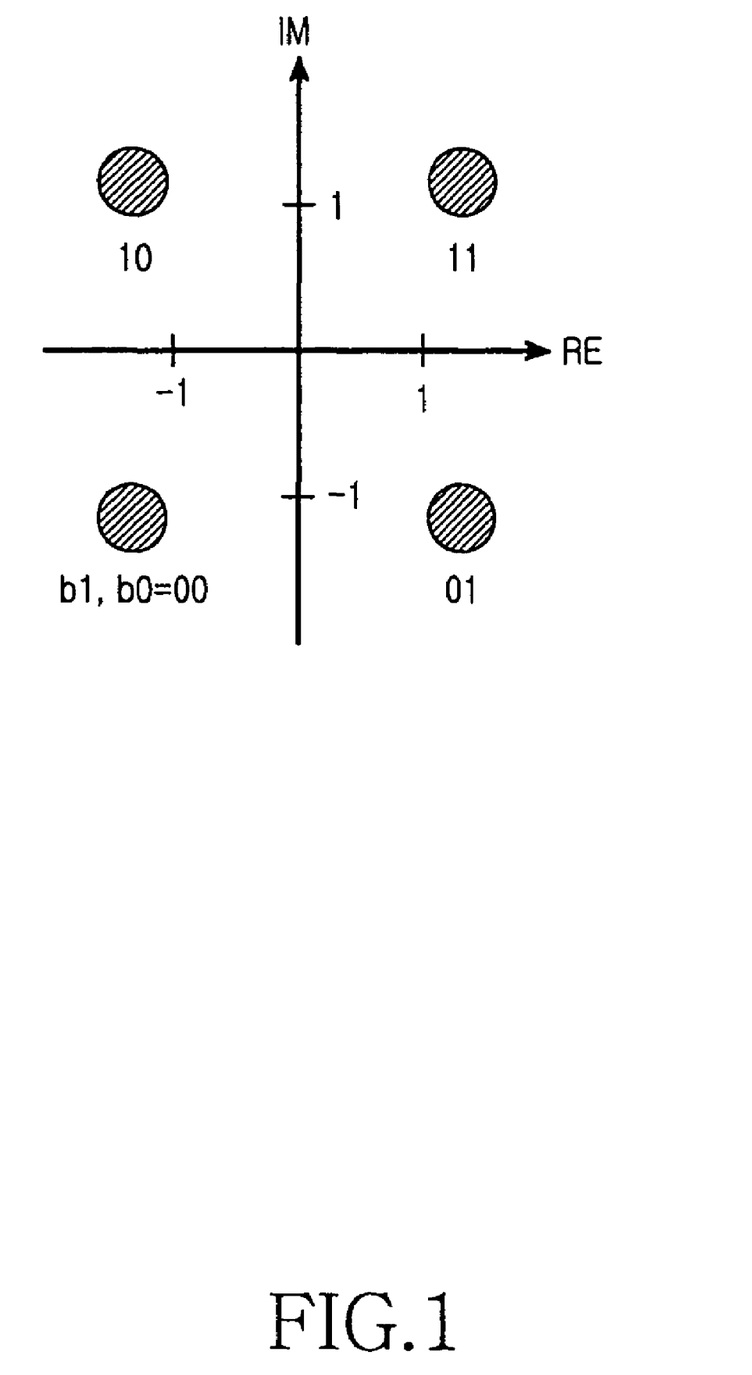
FIG. 1 is a diagram illustrating a gray-decoded QPSK constellation in a general mobile communication system.

FIG. 1 is a diagram illustrating a gray-decoded QPSK constellation in a general mobile communication system. When the QPSK constellation of FIG. 1 is used, LLRs for 2 bits of b0 and b1 are expressed as Equation (2) below, in which it is assumed that channel noise is additive white Gaussian noise (AWGN).

$$LLR_{b0} = \log \frac{\exp\left(-\frac{(RE[r]-s^0)^2}{2\sigma^2}\right)}{\exp\left(-\frac{(RE[r]-s^1)^2}{2\sigma^2}\right)}$$ Equation (2)

$$= \frac{RE[r] \cdot (s^0 - s^1)}{\sigma^2}$$

$$= \frac{RE[r] \cdot (-2)}{\sigma^2}$$

if $(s^0 = -1, s^1 = 1)$ $$LLR_{b1} = \log \frac{\exp\left(-\frac{(IM[r]-s^0)^2}{2\sigma^2}\right)}{\exp\left(-\frac{(IM[r]-s^1)^2}{2\sigma^2}\right)}$$

$$= \frac{IM[r] \cdot (s^0 - s^1)}{\sigma^2}$$

$$= \frac{IM[r] \cdot (-2)}{\sigma^2}$$

if $(s^0 = -1, s^1 = 1)$

However, in the case of 16QAM, a transmitter selects 16 4-bit signal points in a constellation, and a receiver calculates LLRs using both of the 2 signal points in the process of calculating aposteriory probabilities, as there are 2 signal points associated with each bit, thereby increasing its calculation load.

Figure 2:
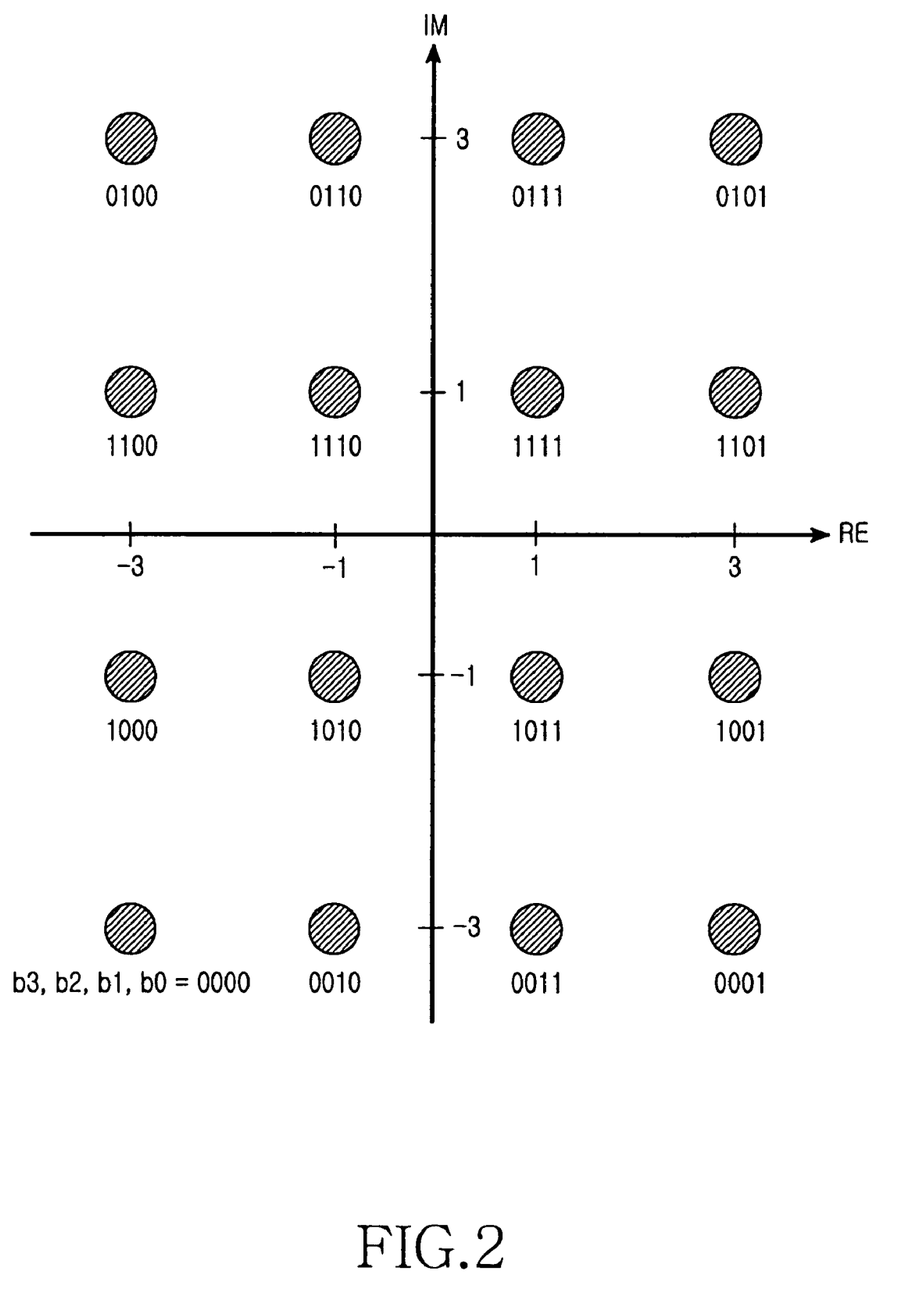
FIG. 2 is a diagram illustrating a gray-decoded 16QAM constellation in a general mobile communication system.

FIG. 2 is a diagram illustrating a gray-decoded 16QAM constellation in a general mobile communication system. When the conventional 16QAM constellation of FIG. 2 is used, LLRs for b0, b1, b2 and b3 representing signal points in the constellation are calculated using Equation (3) below.

$$LLR_{b0} = \log \frac{\sum_i p(\text{real}(r) \mid s_i^0)}{\sum_i p(\text{real}(r) \mid s_i^1)}$$ Equation (3)

$$= \log \frac{\exp\left(-\frac{(\text{real}(r)-s_0^0)^2}{2\sigma^2}\right) + \exp\left(-\frac{(\text{real}(r)-s_1^0)^2}{2\sigma^2}\right)}{\exp\left(-\frac{(\text{real}(r)-s_0^1)^2}{2\sigma^2}\right) + \exp\left(-\frac{(\text{real}(r)-s_1^1)^2}{2\sigma^2}\right)}$$

$$= \log \frac{\exp\left(-\frac{(\text{real}(r)-(-3))^2}{2\sigma^2}\right) + \exp\left(-\frac{(\text{real}(r)-(-1))^2}{2\sigma^2}\right)}{\exp\left(-\frac{(\text{real}(r)-(+1))^2}{2\sigma^2}\right) + \exp\left(-\frac{(\text{real}(r)-(+3))^2}{2\sigma^2}\right)}$$

$$LLR_{b1} = \log \frac{\exp\left(-\frac{(\text{real}(r)-(-3))^2}{2\sigma^2}\right) + \exp\left(-\frac{(\text{real}(r)-(+3))^2}{2\sigma^2}\right)}{\exp\left(-\frac{(\text{real}(r)-(-1))^2}{2\sigma^2}\right) + \exp\left(-\frac{(\text{real}(r)-(+1))^2}{2\sigma^2}\right)}$$

$$LLR_{b2} = \log \frac{\exp\left(-\frac{(imag(r)-(-3))^2}{2\sigma^2}\right) + \exp\left(-\frac{(imag(r)-(-1))^2}{2\sigma^2}\right)}{\exp\left(-\frac{(imag(r)-(+1))^2}{2\sigma^2}\right) + \exp\left(-\frac{(imag(r)-(+3))^2}{2\sigma^2}\right)}$$

$$LLR_{b3} = \log \frac{\exp\left(-\frac{(imag(r)-(-3))^2}{2\sigma^2}\right) + \exp\left(-\frac{(imag(r)-(+3))^2}{2\sigma^2}\right)}{\exp\left(-\frac{(imag(r)-(-1))^2}{2\sigma^2}\right) + \exp\left(-\frac{(imag(r)-(+1))^2}{2\sigma^2}\right)}$$

It can be understood from Equation (3) that the conventional LLRs each require two exponential calculations for each numerator and denominator, and the terms increase in number as an order of QAM increases.

Accordingly, a need exists for a system and method for reducing calculations for decoding in a mobile communication system.

SUMMARY OF THE INVENTION

It is, therefore, an object of the present invention to substantially solve the above and other problems, and provide an LLR calculation method and apparatus that is capable of reducing calculations for decoding in a mobile communication system.

It is another object of the present invention to provide an LLR calculation method and apparatus that is capable of reducing calculations for decoding in a mobile communication system using a high-order QAM modulation scheme.

According to one aspect of the present invention, a method is provided for calculating a log-likelihood ratio (LLR) for decoding in a receiver for a mobile communication system. The method comprises the steps of determining selection bits for distinguishing four quadrants in a constellation representing signal points of transmission symbols, determining domain bits for distinguishing the signal points in each domain of the four quadrants according to a modulation order of the transmission symbols, repeating an operation of dividing a received signal into a real component and an imaginary component according to the number of determined domain bits, calculating absolute values of the real component and the imaginary component and origin-shifting the absolute values, and calculating LLRs for the selection bits and subsequently calculating LLRs for corresponding domain bits each time the origin-shifted received signal is received.

According to another aspect of the present invention, an apparatus is provided for calculating a log-likelihood ratio (LLR) for decoding in a receiver for a mobile communication system. The apparatus comprises a first LLR calculator for receiving a received signal and calculating LLRs for selection bits for distinguishing four quadrants in a constellation representing signal points of transmission symbols, and at least one second LLR calculator for dividing the received signal into a real component and an imaginary component, calculating absolute values of the real component and the imaginary component, origin-shifting the absolute values, and calculating LLRs for corresponding bits by receiving the origin-shifted received signal, for domain bits determined according to a modulation order of the transmission symbols, wherein the domain bits are used for distinguishing the signal points in each domain of the four quadrants.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Exemplary embodiments of the present invention will now be described in detail with reference to the annexed drawings. In the following description, detailed descriptions of known functions and configurations incorporated herein have been omitted for clarity and conciseness.

Embodiments of the present invention propose a scheme of reducing calculations by calculating LLRs substantially as in QPSK modulation, even for high-order QAM modulation, in a decoding process of a mobile communication system using gray-encoded QAM modulation. Embodiments of the present invention can be applied to any various decoding scheme using LLRs.

Figure 3:
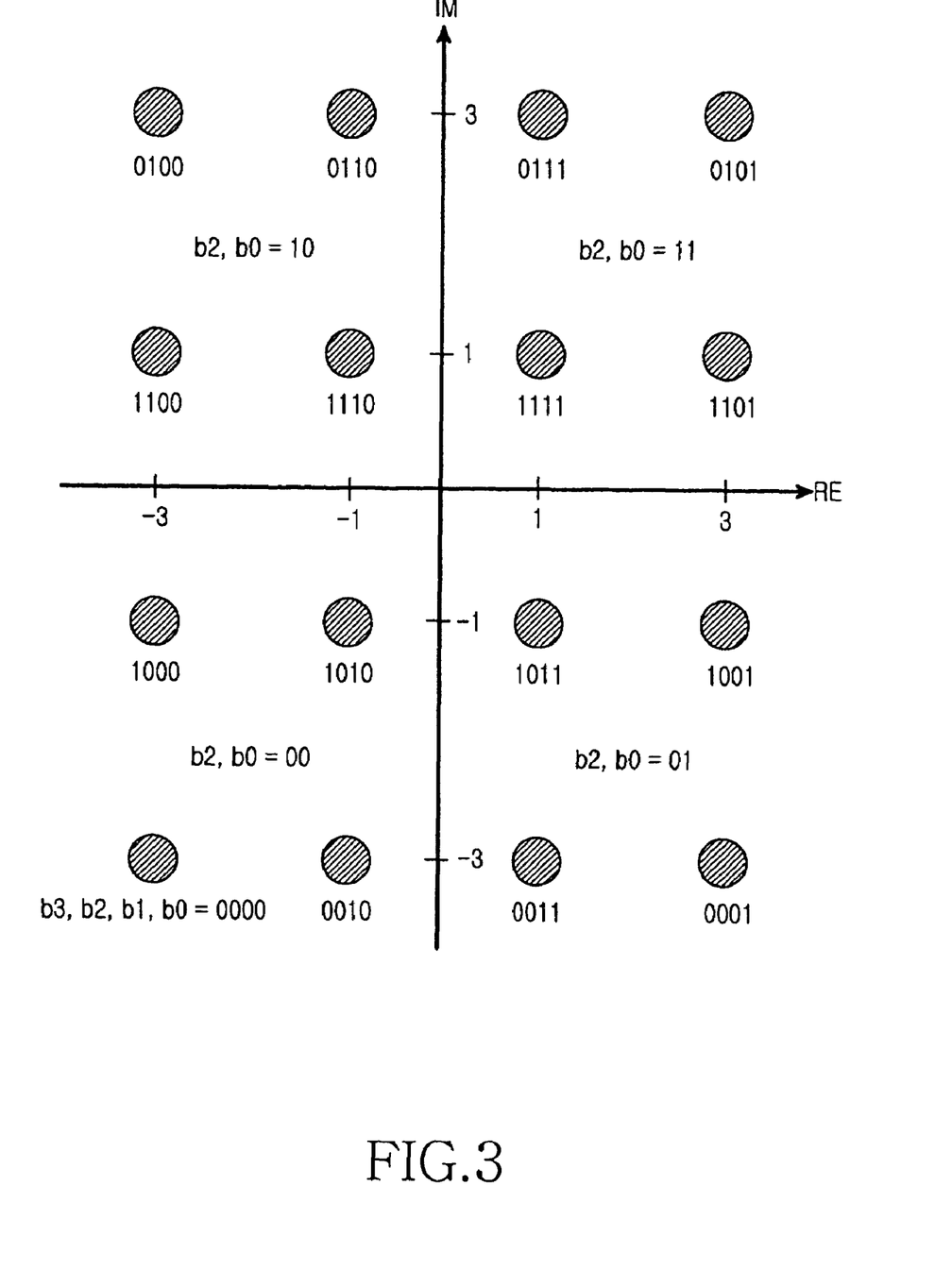
FIG. 3 is a diagram illustrating an exemplary gray-decoded 16QAM constellation divided by selection bits in a mobile communication system according to an embodiment of the present invention.

FIG. 3 is a diagram illustrating an exemplary gray-decoded 16QAM constellation divided by selection bits in a mobile communication system according to an embodiment of the present invention.

Referring to FIG. 3, if for example, bits b0, b1, b2 and b3 indicating signal points of transmission symbols in a constellation are defined as first through fourth bits, respectively, a third bit b2 and a first bit b0 among the first through fourth bits can serve as bits (hereinafter referred to as "selection bits") for selecting one of the four quadrants of the constellation. That is, when the first bit b0 is '1', the signal points of the transmission symbols are mapped to a positive domain on a real axis in the constellation, and when the first bit b0 is '0', the signal points of the transmission symbols are mapped to a negative domain on the real axis in the constellation. Further, when the third bit b2 is '1', the signal points of the transmission symbols are mapped to a positive domain on an imaginary axis in the constellation, and when the third bit b2 is '0', the signal points of the transmission symbols are mapped to a negative domain on the imaginary axis in the constellation. Therefore, LLRs in 16QAM can be replaced with LLRs in QPSK in which the constellation is roughly divided into four quadrants using the two selection bits.

Figure 4:
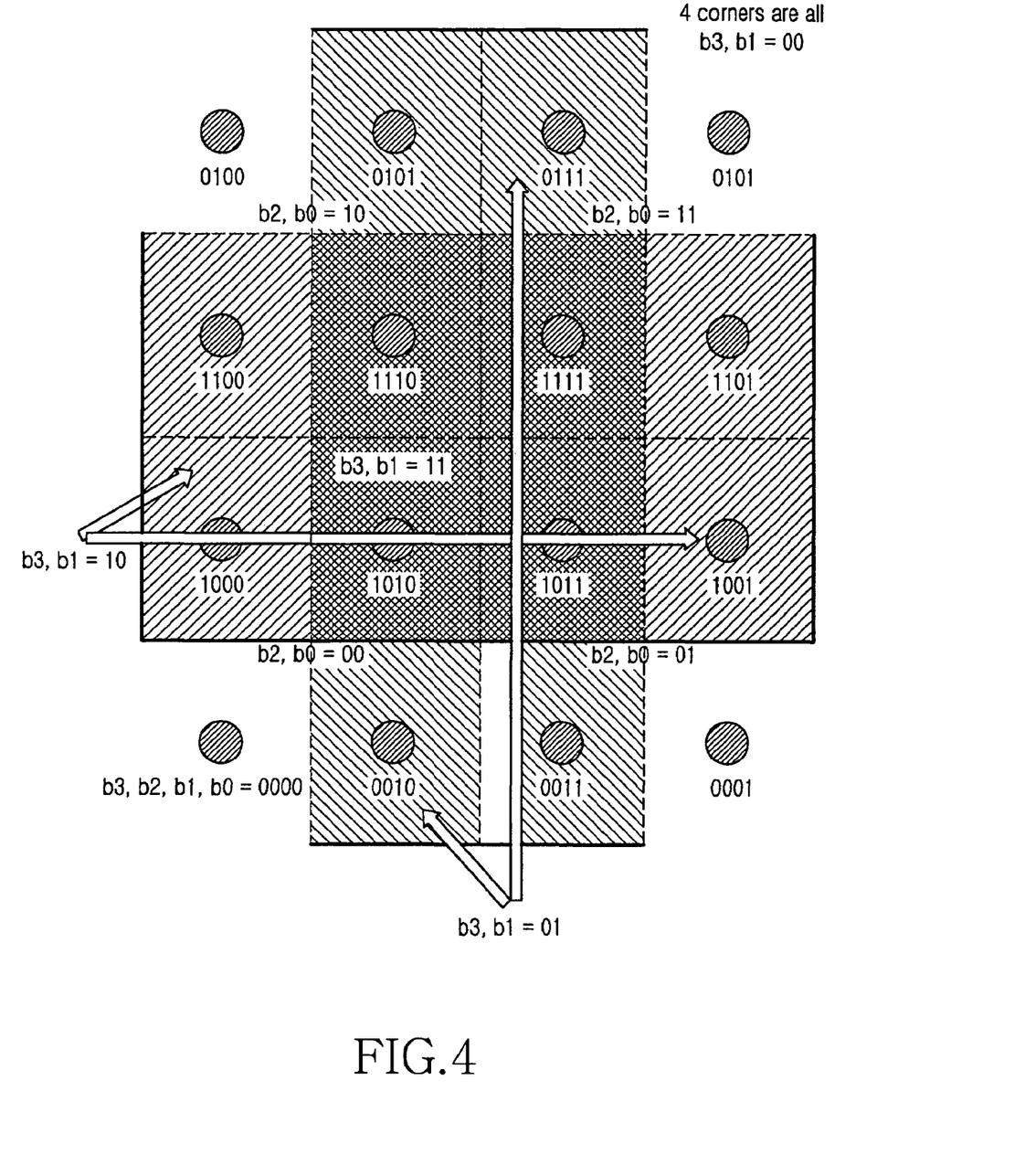
FIG. 4 is a diagram illustrating an exemplary gray-decoded 16QAM constellation divided by domain bits in a mobile communication system according to an embodiment of the present invention.
Figure 5:
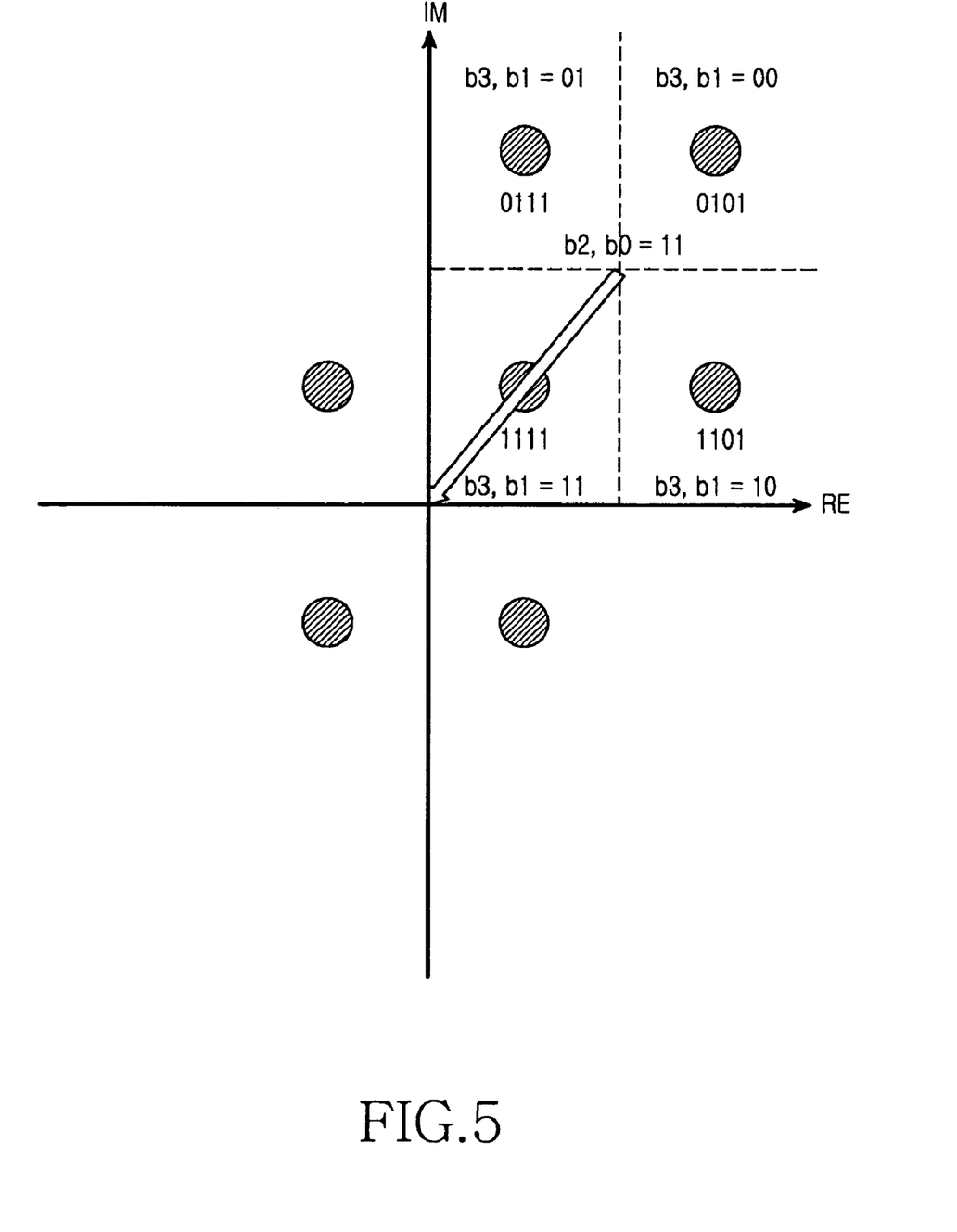
FIG. 5 is a diagram illustrating an exemplary gray-decoded 16QAM constellation in which signal points distinguished by domain bits are origin-shifted in a mobile communication system according to an embodiment of the present invention.

With reference to FIGS. 4 and 5, a description will now be made of a decoding method for distinguishing signal points in four domains each belonging to one of four quadrants of the constellation divided by the selection bits.

FIG. 4 is a diagram illustrating an exemplary gray-decoded 16QAM constellation divided by domain bits in a mobile communication system according to an embodiment of the present invention.

Referring to FIG. 4, a fourth bit b3 and a second bit b1 among the first through fourth bits b0, b1, b2 and b3 indicating signal points of transmission symbols in a constellation serve as bits (hereinafter referred to as "domain bits") for selecting one of signal points in four domains in each of four quadrants of the constellation. All of the signal points distinguished by the domain bits are symmetrically mapped on the basis of the origin (0,0). That is, the domains having the same hatching in the four quadrants of FIG. 4 are symmetrical to each other on the basis of the origin. Therefore, LLRs of the fourth bit b3 and the second bit b1 are calculated by dividing a received signal into a real component and an imaginary component, calculating absolute values of the real component and the imaginary component, and then converting the received signal into a signal obtained through origin shift. In this manner, it is possible to apply LLRs having the same form as that in QPSK, even in high-order QAM.

FIG. 5 is a diagram illustrating an exemplary gray-decoded 16QAM constellation in which signal points distinguished by domain bits are origin-shifted in a mobile communication system according to an embodiment of the present invention.

It can be understood from FIG. 5 that it is possible to apply LLRs having the same form as that in QPSK, even in 16QAM as shown in FIG. 5, by calculating absolute values of a real component and an imaginary component of a received signal distinguished by the domain bits and then representing domains given by the fourth bit b3 and the second bit b1 through origin shifting.

When the selection bits and the domain bits described in connection with FIGS. 3 through 5 are used in a decoding process, LLRs corresponding to the first through fourth bits b0, b1, b2 and b3 are calculated using Equation (4) below.

$$LLR_{b0} = \log \frac{\sum_i p(\text{RE}[r] \mid s_i^0)}{\sum_i p(\text{RE}[r] \mid s_i^1)} \quad \text{Equation (4)}$$

$$= \log \frac{\exp\left(-\frac{(\text{RE}[r] - s_{0,2}^0)^2}{2\sigma^2}\right)}{\exp\left(-\frac{(\text{RE}[r] - s_{0,2}^1)^2}{2\sigma^2}\right)}$$

$$= \frac{\text{RE}[r] \cdot (s_{0,2}^0 - s_{0,2}^1)}{\sigma^2}$$

$$LLR_{b2} = \log \frac{\sum_i p(\text{IM}[r] \mid s_i^0)}{\sum_i p(\text{IM}[r] \mid s_i^1)}$$

$$= \log \frac{\exp\left(-\frac{(\text{IM}[r] - s_{0,2}^0)^2}{2\sigma^2}\right)}{\exp\left(-\frac{(\text{IM}[r] - s_{0,2}^1)^2}{2\sigma^2}\right)}$$

$$= \frac{\text{IM}[r] \cdot (s_{0,2}^0 - s_{0,2}^1)}{\sigma^2}$$

$$LLR_{b1} = \log \frac{\exp\left(-\frac{((\text{abs}(\text{RE}[r]) - 2) - s_{1,3}^0)^2}{2\sigma^2}\right)}{\exp\left(-\frac{((\text{abs}(\text{RE}[r]) - 2) - s_{1,3}^1)^2}{2\sigma^2}\right)}$$

$$= \frac{(\text{abs}(\text{RE}[r]) - 2) \cdot (s_{1,3}^0 - s_{1,3}^1)}{\sigma^2}$$

$$LLR_{b3} = \log \frac{\exp\left(-\frac{((\text{abs}(\text{IM}[r]) - 2) - s_{1,3}^0)^2}{2\sigma^2}\right)}{\exp\left(-\frac{((\text{abs}(\text{IM}[r]) - 2) - s_{1,3}^1)^2}{2\sigma^2}\right)}$$

$$= \frac{(\text{abs}(\text{IM}[r]) - 2) \cdot (s_{1,3}^0 - s_{1,3}^1)}{\sigma^2}$$

In Equation (4), RE[r] denotes an operator used for extracting a real component from a received signal r, IM[r] denotes an operator used for extracting an imaginary component from the received signal r, and abs( ) denotes an operator used for calculating an absolute value for a parenthesized value. Further, $s_{0,2}^0$ and $s_{0,2}^1$ denote representative values of transmission signals corresponding to 0 and 1, respectively, during calculation of LLRs for the first and third bits b0 and b2, used as selection bits for distinguishing the four quadrants.

In addition, $s_{1,3}^0$ and $s_{1,3}^1$ denote representative values of transmission signals corresponding to 0 and 1, respectively, during calculation of LLRs for the second and fourth bits b1 and b3 used as domain bits for distinguishing four domains in each of the four quadrants, and cy denotes a noise scattered value for the received signal r. Although there is one signal point per each of the four quadrants in the conventional QPSK transmission, there are signal points of four domains in each of the four quadrants in the 16QAM transmission. Therefore, 16QAM should preferably calculate an LLR using one value representing the signal points. In Equation (4), in LLRs for the second and fourth bits b1 and b3, which are the domain bits, the value '−2' shown in a denominator denotes origin shifting of the corresponding signal point.

When a QAM signal is received, LLRs of the bits indicating signal points in the constellation can remove the exponential terms as shown in Equation (4), as compared with Equation (3) including a plurality of exponential terms in the denominator and numerator, thereby contributing to a reduction in the calculation load in the decoding process of the receiver.

Figure 6:
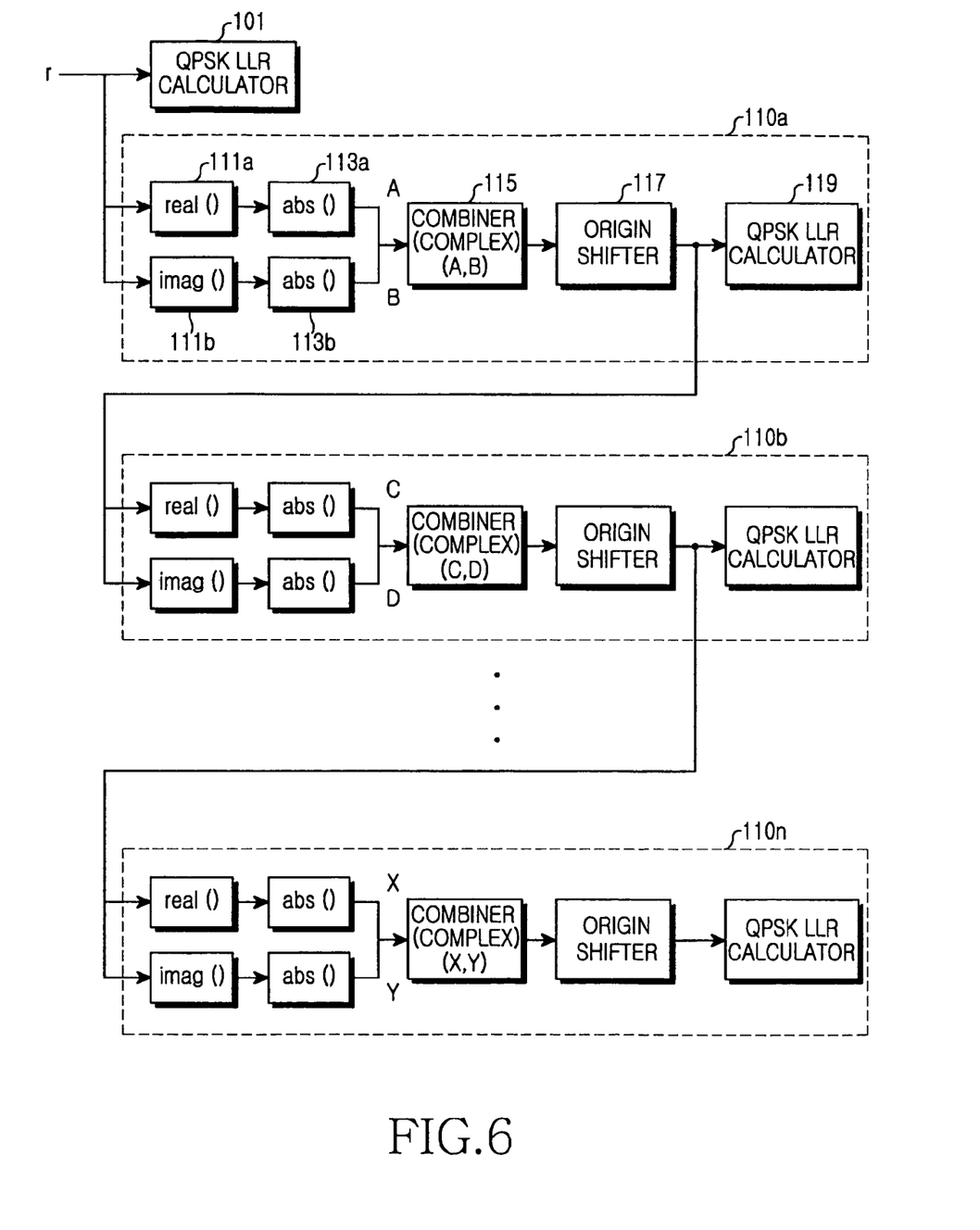
FIG. 6 is a block diagram illustrating a structure of an LLR calculation apparatus for decoding in a mobile communication system according to an embodiment of the present invention.

FIG. 6 is a block diagram illustrating a structure of an LLR calculation apparatus for decoding in a mobile communication system according to an embodiment of the present invention. The proposed apparatus calculates LLRs for decoding in the form of QPSK upon receiving a signal transmitted by high-order QAM. The apparatus of FIG. 6 can be either disposed in a decoder of a receiver or arranged to precede the decoder.

Referring to FIG. 6, the LLR calculation apparatus comprises a plurality of LLR calculators 101, 110a, 110b, ..., 110n, the number of which corresponds to an order of QAM. In 16 or higher-order QAM, in the process where a received signal r is sequentially input to the LLR calculators 110a, 110b, ..., 110n, each of the LLR calculators 110a, 110b, ..., 110n defines domain bits for distinguishing domains in each of the four quadrants in the constellation, divides the received signal r into a real component and an imaginary component, calculates absolute values of the real component and the imaginary component, origin-shifts the absolute values to make it possible to apply QPSK LLRs, calculates general QPSK LLRs for the corresponding domain bits, and outputs the LLRs to a decoder (not shown). The origin-shifted received signal r is then input to an LLR calculator in the next stage. Although it is assumed herein that the selection bits and the domain bits are determined by the LLR calculators 101, 110a, 110b, ..., 110n, the selection bits and the domain bits can be previously determined in the method of FIGS. 3 and 4 if an order of QAM is given.

The LLR calculator 101 is shown in a first stage and is comprised of a general QPSK LLR calculator which determines two selection bits to distinguish four quadrants in the constellation of FIG. 3, and outputs a QPSK LLR for the selection bits. The LLR calculators 110a, 110b, ..., 110n in the second and later stages each determine two domain bits for distinguishing domains in each of the four quadrants.

Each of the LLR calculators 110a, 110b, ..., 110n comprises a real component extractor 111a and an imaginary component extractor 111b for extracting a real component and an imaginary component of the received signal r, absolute value calculators 113a and 113b for calculating absolute values of the extracted real component and imaginary component, a combiner 115 for representing the absolute values of the real component and the imaginary component as a coordinate value in the constellation, an origin shifter 117 for origin-shifting the coordinate value, and an QPSK LLR calculator 119 for calculating a QPSK LLR for the domain bits.

In the foregoing structure, the LLR calculators 110a, 110b, ..., 110n calculate QPSK LLRs by repeating absolute calculation and origin shifting. In this embodiment, one LLR calculator 101 is enabled for QPSK demodulation, two LLR calculators 101 and 110a are enabled for 16QAM, and three LLR calculators 101, 110a and 110b are enabled for 64QAM, to thereby generate LLRs mapped to corresponding bits of the received signal r. In this manner, the LLR calculators are selectively enabled for 64 or higher-order QAM.

Figure 7:
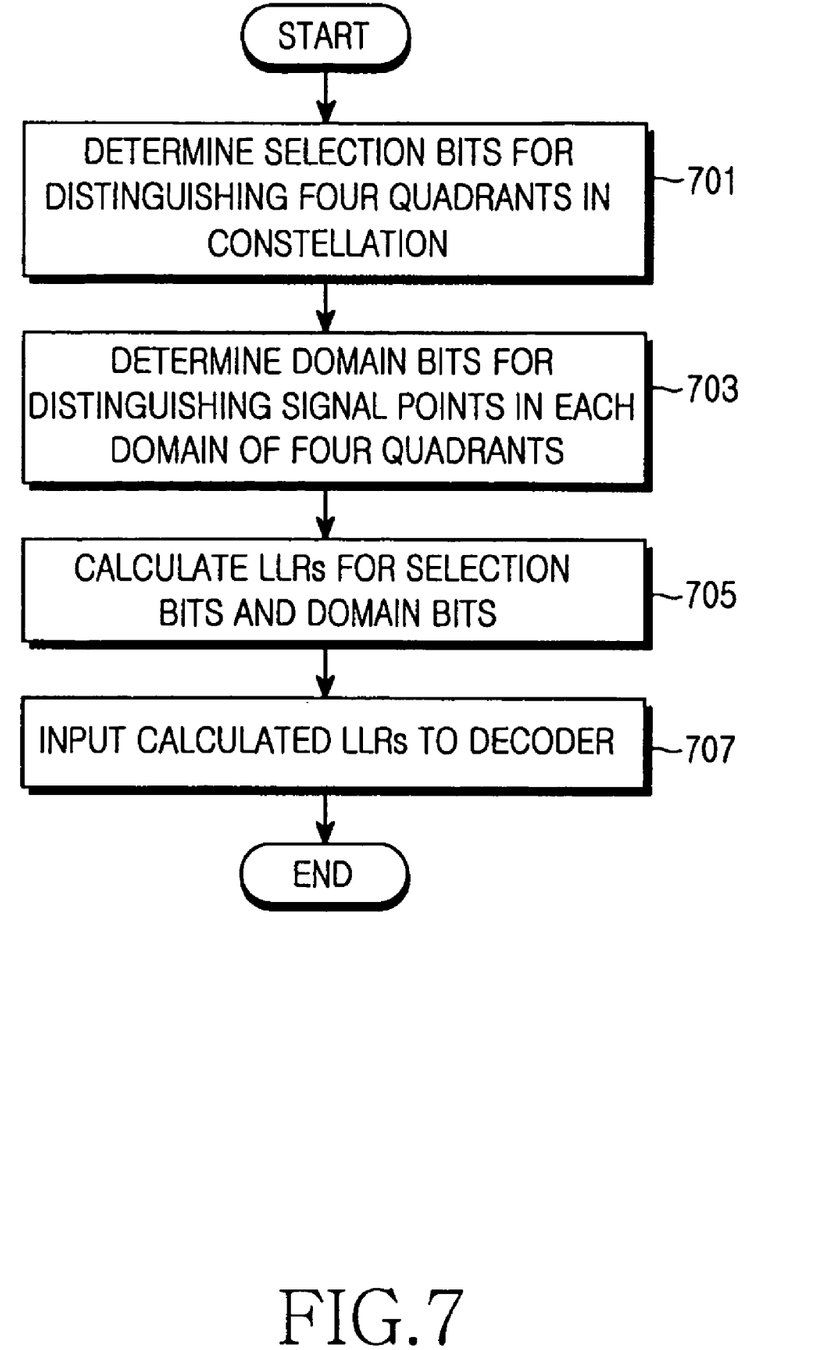
FIG. 7 is a flowchart illustrating an LLR calculation method for decoding in a mobile communication system according to an embodiment of the present invention.

FIG. 7 is a flowchart illustrating an LLR calculation method for decoding in a mobile communication system according to an embodiment of the present invention.

In step 701, the LLR calculator 101 in a first state receives a received signal r, and determines selection bits for distinguishing four quadrants in a constellation, for example, by calculating LLRs as shown in FIG. 3, or sets predetermined selection bits if an order of QAM is given. In step 703, LLR calculators 110a, 110b, ..., 110n in the second and later stages determine domain bits for distinguishing domains in each of the four quadrants in the constellation, for example, by distinguishing signal points as shown in FIG. 4, or sets predetermined domain bits if the order of QAM is given. In step 705, each of the LLR calculators 110a, 110b, ..., 110n divides a received signal from its preceding stage into a real component and an imaginary component, calculates absolute values of the real component and the imaginary component, and then origin-shifts the absolute values as shown in FIG. 5. In addition, each of the LLR calculators 110a, 110b, ..., 110n calculates an LLR for the selection bits and the domain bits using the origin-shifted received signal. In step 707, each of the LLR calculators 110a, 110b, ..., 110n inputs the calculated LLR to a decoder using a predetermined bit of the corresponding bits.

However, the present invention is not restricted to turbo coding in a mobile communication system using QPSK and QAM modulation, but can be applied to any number of decoding techniques using LLRs.

As can be understood from the foregoing description, embodiments of the present invention provide an improved LLR calculation method applicable to all of the decoding algorithms using LLRs in a decoding process of a receiver for a system using gray-encoded QAM modulation, thereby performing LLR calculation in substantially the same form as that in QPSK, even for QAM having a higher order than QPSK. By doing so, it is possible to reduce calculations in the process of calculating LLRs in QAM modulation.

While embodiments of the present invention have been shown and described with reference to certain exemplary embodiments thereof, it will be understood by those skilled in the art that various changes in form and detail may be made therein without departing from the spirit and scope of the invention as defined by the appended claims.

What is claimed is:

1. A method for calculating a log-likelihood ratio (LLR) for decoding in a receiver for a mobile communication system, the method comprising the steps of:

determining selection bits for distinguishing four quadrants in a constellation representing signal points of transmission symbols;

determining domain bits for distinguishing the signal points in each domain of the four quadrants according to a modulation order of the transmission symbols;

repeating an operation of dividing a received signal into a real component and an imaginary component according to the number of determined domain bits, calculating absolute values of the real component and the imaginary component, and origin-shifting a coordinate value for the received signal represented as the absolute values in the constellation; and calculating LLRs for the selection bits, and subsequently calculating LLRs for corresponding domain bits each time the origin-shifted received signal is received.

2. The method of claim 1, wherein the LLRs are calculated using a calculation equation applied to Quadrature Phase Shift Keying (QPSK) modulation.

3. The method of claim 2, wherein the calculation equation is defined as:

$$LLR_{b0} = \log \frac{\exp\left(-\frac{(RE[r]-s^0)^2}{2\sigma^2}\right)}{\exp\left(-\frac{(RE[r]-s^1)^2}{2\sigma^2}\right)} = \frac{RE[r] \cdot (s^0 - s^1)}{\sigma^2} = \frac{RE[r] \cdot (-2)}{\sigma^2}$$

if $(s^0 = -1, s^1 = 1)$ $$LLR_{b1} = \log \frac{\exp\left(-\frac{(IM[r]-s^0)^2}{2\sigma^2}\right)}{\exp\left(-\frac{(IM[r]-s^1)^2}{2\sigma^2}\right)} = \frac{IM[r] \cdot (s^0 - s^1)}{\sigma^2} = \frac{IM[r] \cdot (-2)}{\sigma^2}$$

if $(s^0 = -1, s^1 = 1)$ wherein 'r' denotes a received signal, RE[r] denotes an operator used for extracting a real component from the received signal r, IM[r] denotes an operator used for extracting an imaginary component from the received signal r, and $\sigma$ denotes a noise scattered value.

4. The method of claim 1, wherein the decoding denotes a decoding for a Quadrature Amplitude Modulation (QAM)-modulated signal.

5. The method of claim 1, wherein the number of the selection bits and the number of the domain bits are both 2.

6. The method of claim 4, wherein, if an order of QAM is given as $4^N$, further comprising the steps of:

repeating the origin-shifting step (N−1) times where N≧1; and calculating the LLRs for the domain bits (N−1) times.

7. The method of claim 4, wherein:

the bits indicating the signal points of the transmission symbols in the constellation are defined as b0, b1, b2 and b3; and the bits b0 and b2 serve as the selection bits and the bits b1 and b3 serve as the domain bits.

8. The method of claim 7, wherein LLRs for the bits b0, b1, b2 and b3 are calculated using the following equation defined as:

$$LLR_{b0} = \log \frac{\sum_i p(RE[r]|s_i^0)}{\sum_i p(RE[r]|s_i^1)}$$

$$= \log \frac{\exp\left(-\frac{(RE[r]-s_{0,2}^0)^2}{2\sigma^2}\right)}{\exp\left(-\frac{(RE[r]-s_{0,2}^1)^2}{2\sigma^2}\right)}$$

$$= \frac{RE[r] \cdot (s_{0,2}^0 - s_{0,2}^1)}{\sigma^2}$$

$$LLR_{b2} = \log \frac{\sum_i p(IM[r]|s_i^0)}{\sum_i p(IM[r]|s_i^1)}$$

$$= \log \frac{\exp\left(-\frac{(IM[r]-s_{0,2}^0)^2}{2\sigma^2}\right)}{\exp\left(-\frac{(IM[r]-s_{0,2}^1)^2}{2\sigma^2}\right)}$$

$$= \frac{IM[r] \cdot (s_{0,2}^0 - s_{0,2}^1)}{\sigma^2}$$

$$LLR_{b1} = \log \frac{\exp\left(-\frac{((abs(RE[r]))-2)-s_{1,3}^0)^2}{2\sigma^2}\right)}{\exp\left(-\frac{((abs(RE[r]))-2)-s_{1,3}^1)^2}{2\sigma^2}\right)}$$

$$= \frac{(abs(RE[r])-2) \cdot (s_{1,3}^0 - s_{1,3}^1)}{\sigma^2}$$

$$LLR_{b3} = \log \frac{\exp\left(-\frac{((abs(IM[r]))-2)-s_{1,3}^0)^2}{2\sigma^2}\right)}{\exp\left(-\frac{((abs(IM[r]))-2)-s_{1,3}^1)^2}{2\sigma^2}\right)}$$

$$= \frac{(abs(IM[r])-2) \cdot (s_{1,3}^0 - s_{1,3}^1)}{\sigma^2}$$

wherein 'r' denotes a received signal, RE[r] denotes an operator used for extracting a real component from the received signal r, IM[r] denotes an operator used for extracting an imaginary component from the received signal r, abs( ) denotes an operator used for calculating an absolute value for a parenthesized value, $s_{0,2}^0$ and $s_{0,2}^1$ denote representative values of transmission signals corresponding to 0 and 1, respectively, during calculation of LLRs for the bits b0 and b2, $s_{1,3}^0$ and $s_{1,3}^1$ denote representative values of transmission signals corresponding to 0 and 1, respectively, during calculation of LLRs for the bits b1 and b3, and $\sigma$ denotes a noise scattered value of the received signal r.

9. The method of claim 1, wherein the constellation is comprised of a gray-decoded $4^N$ QAM constellation.

10. The method of claim 1, wherein the calculated LLRs are provided as priori information for decoding.

11. An apparatus for calculating a log-likelihood ratio (LLR) for decoding in a receiver for a mobile communication system, the apparatus comprising:

a first LLR calculator for receiving a received signal and calculating LLRs for selection bits for distinguishing four quadrants in a constellation representing signal points of transmission symbols; and at least a second LLR calculator for dividing the received signal into a real component and an imaginary component, calculating absolute values of the real component and the imaginary component, origin-shifting a coordinate value for the received signal represented as the absolute values in the constellation, and calculating LLRs for corresponding bits by receiving the origin-shifted received signal, for domain bits determined according to a modulation order of the transmission symbols, wherein the domain bits are used for distinguishing the signal points in each domain of the four quadrants.

12. The apparatus of claim 11, wherein the second LLR calculator is programmable to receive the origin-shifted received signal from a second LLR calculator in a preceding stage, divide the received signal into a real component and an imaginary component, calculate absolute values of the real component and the imaginary component, and origin-shift the absolute values.

13. The apparatus of claim 11, wherein the second LLR calculator comprises:
   a real component extractor and an imaginary component extractor for extracting a real component and an imaginary component from the received signal, respectively;
   a combiner for representing the real component and the imaginary component as coordinate values of the constellation;
   a origin shifter for origin-shifting the coordinate values; and
   an LLR calculator for calculating the LLRs for the corresponding domain bits.

14. The apparatus of claim 11, wherein the first and second LLR calculators are configured to calculate LLRs using a calculation equation applied to Quadrature Phase Shift Keying (QPSK) modulation.

15. The apparatus of claim 14, wherein the calculation equation is defined as:

$$LLR_{b0} = \log \frac{\exp\left(-\frac{(RE[r]-s^0)^2}{2\sigma^2}\right)}{\exp\left(-\frac{(RE[r]-s^1)^2}{2\sigma^2}\right)} = \frac{RE[r]\cdot(s^0-s^1)}{\sigma^2} = \frac{RE[r]\cdot(-2)}{\sigma^2}$$

if $(s^0 = -1, s^1 = 1)$ $$LLR_{b1} = \log \frac{\exp\left(-\frac{(IM[r]-s^0)^2}{2\sigma^2}\right)}{\exp\left(-\frac{(IM[r]-s^1)^2}{2\sigma^2}\right)} = \frac{IM[r]\cdot(s^0-s^1)}{\sigma^2} = \frac{IM[r]\cdot(-2)}{\sigma^2}$$

if $(s^0 = -1, s^1 = 1)$ wherein 'r' denotes a received signal, RE[r] denotes an operator used for extracting a real component from the received signal r, IM[r] denotes an operator used for extracting an imaginary component from the received signal r, and σ denotes a noise scattered value.

16. The apparatus of claim 11, wherein the decoding denotes decoding for an Quadrature Amplitude Modulation (QAM)-modulated signal.

17. The apparatus of claim 11, wherein the number of the selection bits and the number of the domain bits are both 2.

18. The apparatus of claim 16, wherein, if an order of QAM is given as $4^N$, the origin-shifting is repeated (N−1) times where N≧1, and the LLRs for the domain bits are calculated (N−1) times.

19. The apparatus of claim 16, wherein:
   the bits indicating the signal points of the transmission symbols in the constellation are defined as b0, b1, b2 and b3; and
   the bits b0 and b2 serve as the selection bits and the bits b1 and b3 serve as the domain bits.

20. The apparatus of claim 19, wherein LLRs for the bits b0, b1, b2 and b3 are calculated using the following equation defined as:

$$LLR_{b0} = \log \frac{\sum_i p(RE[r]|s_i^0)}{\sum_i p(RE[r]|s_i^1)}$$

$$= \log \frac{\exp\left(-\frac{(RE[r]-s_{0,2}^0)^2}{2\sigma^2}\right)}{\exp\left(-\frac{(RE[r]-s_{0,2}^1)^2}{2\sigma^2}\right)}$$

$$= \frac{RE[r]\cdot(s_{0,2}^0-s_{0,2}^1)}{\sigma^2}$$

$$LLR_{b2} = \log \frac{\sum_i p(IM[r]|s_i^0)}{\sum_i p(IM[r]|s_i^1)}$$

$$= \log \frac{\exp\left(-\frac{(IM[r]-s_{0,2}^0)^2}{2\sigma^2}\right)}{\exp\left(-\frac{(IM[r]-s_{0,2}^1)^2}{2\sigma^2}\right)}$$

$$= \frac{IM[r]\cdot(s_{0,2}^1-s_{0,2}^0)}{\sigma^2}$$

$$LLR_{b1} = \log \frac{\exp\left(-\frac{((abs(RE[r])-2)-s_{1,3}^0)^2}{2\sigma^2}\right)}{\exp\left(-\frac{((abs(RE[r])-2)-s_{1,3}^1)^2}{2\sigma^2}\right)}$$

$$= \frac{(abs(RE[r])-2)\cdot(s_{1,3}^0-s_{1,3}^1)}{\sigma^2}$$

$$LLR_{b3} = \log \frac{\exp\left(-\frac{((abs(IM[r])-2)-s_{1,3}^0)^2}{2\sigma^2}\right)}{\exp\left(-\frac{((abs(IM[r])-2)-s_{1,3}^1)^2}{2\sigma^2}\right)}$$

$$= \frac{(abs(IM[r])-2)\cdot(s_{1,3}^0-s_{1,3}^1)}{\sigma^2}$$

wherein 'r' denotes a received signal, RE[r] denotes an operator used for extracting a real component from the received signal r, IM[r] denotes an operator used for extracting an imaginary component from the received signal r, abs( ) denotes an operator used for calculating an absolute value for a parenthesized value, $s_{0,2}^0$ and $s_{0,2}^1$ denote representative values of transmission signals corresponding to 0 and 1, respectively, during calculation of LLRs for the bits b0 and b2, $s_{1,3}^0$ and $s_{1,3}^1$ denote representative values of transmission signals corresponding to 0 and 1, respectively, during calculation of LLRs for the bits b1 and b3, and σ denotes a noise scattered value of the received signal r.

* * * * *